(12) United States Patent
Shao et al.

(10) Patent No.: US 9,816,030 B2
(45) Date of Patent: Nov. 14, 2017

(54) SOIL HEAVY METAL CURING AGENT FOR CONTROLLING ACCUMULATION OF HEAVY METALS OF CROPS AND PREPARATION METHOD THEREOF

(71) Applicant: CHINA NATIONAL RICE RESEARCH INSTITUTE, Hangzhou, Zhejiang (CN)

(72) Inventors: Guosheng Shao, Zhejiang (CN); Xihong Shen, Zhejiang (CN); Liyong Cao, Zhejiang (CN); Jing Wang, Zhejiang (CN)

(73) Assignee: CHINA NATIONAL RICE RESEARCH INSTITUTE (CN)

( * ) Notice: Subject to any disclaimer, the term of this patent is extended or adjusted under 35 U.S.C. 154(b) by 8 days.

(21) Appl. No.: 14/765,340

(22) PCT Filed: Jul. 24, 2013

(86) PCT No.: PCT/CN2013/000883
§ 371 (c)(1),
(2) Date: Aug. 2, 2015

(87) PCT Pub. No.: WO2014/121426
PCT Pub. Date: Aug. 14, 2014

(65) Prior Publication Data
US 2016/0009994 A1   Jan. 14, 2016

(30) Foreign Application Priority Data

Feb. 5, 2013 (CN) .......................... 2013 1 0045114
May 7, 2013 (CN) .......................... 2013 1 0164503

(51) Int. Cl.
*C09K 17/50* (2006.01)
*C05G 3/00* (2006.01)
*C05G 3/04* (2006.01)
*C09K 17/40* (2006.01)

(52) U.S. Cl.
CPC ................ *C09K 17/50* (2013.01); *C05G 3/00* (2013.01); *C05G 3/04* (2013.01); *C09K 17/40* (2013.01)

(58) Field of Classification Search
CPC .......... C09K 17/50; C09K 17/40; C05G 3/00; C05G 3/04
See application file for complete search history.

(56) References Cited

U.S. PATENT DOCUMENTS

2011/0182670 A1* 7/2011 Rossato .................... B09C 1/08
405/128.75

FOREIGN PATENT DOCUMENTS

CN    101962553 A  *  2/2011

* cited by examiner

*Primary Examiner* — Kaj K Olsen
*Assistant Examiner* — Alexander Polyansky

(57) ABSTRACT

The present invention provides a soil heavy metal curing agent for controlling accumulation of heavy metals of crops and its preparation method. The curing agent is made from the following parts of raw materials by weight: 60~140 parts of substance containing carbon-carbon double bond; 1~400 parts of sulfo-compound by sulfur; 50~500 parts of organic matter by 10% water content; 0~400 parts of water; 0~100 parts of an initiator; 0~200 parts of a reducer; and 0~200 parts of a strong base. The curing agent for heavy metals in the soil according to the present invention can reduce the cadmium, lead and mercury content in the soil and further greatly reduce the roots' absorption of these heavy metals.

2 Claims, No Drawings

SOIL HEAVY METAL CURING AGENT FOR CONTROLLING ACCUMULATION OF HEAVY METALS OF CROPS AND PREPARATION METHOD THEREOF

FIELD

The present invention relates to the technical field of fertilizers, more specifically to a curing agent for heavy metals in the soil to control the accumulation of heavy metals in crops and its preparation method.

BACKGROUND

Heavy metals such as cadmium, lead and mercury are non-essential elements for plants and are even hazardous to the growth of plants. They are deemed as heavy-metal pollutants for plant growth and food safety. The excessive accumulation of these hazardous heavy metals in food will enable them to enter into the food chain, and even threaten human health. According to the results of a quality and safety survey of rice in various regions of China in 2002 and 2003 made by the Quality Inspection and Supervision Center of Rice and Rice Products, Ministry of Agriculture, one of the quality and safety issues of rice is the over-the-limit content of heavy metals such as cadmium and lead. The over-the-limit rate is more than 10%. Three industrial wastes, non-ferrous metal mining and sewage irrigation are causes that may lead to an excessive amount of toxic heavy metals in the soil and excessive absorption by the plant, being the main source of the accumulation of heavy metals in plants or crops. Therefore, strict limiting criteria for heavy metals in soil and foods (or grains) have been established in various countries. For example, in China, the limit of cadmium in cereals is 0.2 mg/kg, that of lead 0.2 mg/kg and that of mercury 0.02 mg/kg.

Cadmium, lead and mercury that are accumulated in plant foods, such as rice, barley and wheat, are mainly absorbed by the roots from the soil and finally accumulated in the harvest parts after flowing to the top upon transpiration. Research shows that the contents of cadmium, lead and mercury in the soil, especially the effective content (namely absorption by the roots) are the key factors when the roots absorb cadmium, lead and mercury from the soil. Hence, to reduce and control the effective cadmium, lead and mercury content in the soil by various agronomic means is always a key study subject at home and abroad. For instance, lime is applied on acidic and slightly acidic soil to raise the pH value of the soil, which obviously decreases the effectiveness of cadmium, lead and mercury in the soil and finally reduces the absorption of such heavy metals by the roots. However, the application of lime has also a lot of side effects. For example, it may cause the rise of the pH value in the soil, leading to the reduction of the required contents of multiple microelements like iron, manganese and zinc while decreasing such heavy metals, easily resulting in nutrient deficiency in the crops and their failure to thrive. On the other hand, the considerable difference of pH values and pH buffer capacities for different regions and soils gives rise to a great difficulty in accurately controlling the lime application amount. As to paddy rice, the inundation can facilitate the increase of soil reducibility, and the increase of elements such as ferrous iron in the soil and the promotion of the deposit of cadmium, lead and mercury in the form of sulfide, on one hand, decreases the soil effectiveness of these heavy metals. On the other hand, a decrease in the roots' absorption capacity for these elements, greatly reduces the roots' absorption and accumulation of toxic heavy metals from the soil. But for paddy rice itself, long-term inundation is not conducive to its growth and is apt to cause an increase of arsenic absorption in rice.

It is a key orientation of studies around the world to add a curing agent or adsorbent in the soil to combine and fix or absorb heavy metals in the soil like cadmium, lead and mercury. The curing agent or adsorbent reported mainly includes zeolite, kieselguhr, sepiolite, bentonite and limestone, and even alkaline cinder, but there is still no curing agent or adsorbent for heavy metals in the soil that is produced and applied broadly. The mainly reasons lie in their being non-environmentally-friendly, high cost and no popularization efforts as to their use value.

SUMMARY

The objective of the present invention is to provide a curing agent for heavy metals in the soil to control the accumulation of heavy metals in crops and a technical solution to its preparation method to address the problems in the prior art.

The curing agent for heavy metals in the soil to control the accumulation of heavy metals in crops is characterized in that it is made from the following parts of raw materials by weight:

60~140 parts of a substance containing carbon-carbon double bond; 1~400 parts of sulfo-compound by sulfur; 50~500 parts of organic matter by 10% water content; 0~400 parts of water; 0~100 parts of initiator; 0~200 parts of a reducer; and 0~200 parts of a strong base.

The curing agent for heavy metals in the soil to control the accumulation of heavy metals in crops is characterized in that it is made from the following parts of raw materials by weight:

80~120 parts of the substance containing carbon-carbon double bond; 50~300 parts of sulfo-compound by sulfur; 100~400 parts of organic matter by 10% water content; 50~300 parts of water; 10~80 parts of initiator; 50~150 parts of a reducer, and 50~150 parts of a strong base.

The curing agent for heavy metals in the soil to control the accumulation of heavy metals in crops is characterized in that it is made from the following parts of raw materials by weight:

90~110 parts of the substance containing carbon-carbon double bond; 80~150 parts of sulfo-compound by sulfur; 200~300 parts of organic matter by 10% water content; 100~200 parts of water; 40~60 parts of initiator; 80~110 parts of a reducer; and 80~110 parts of a strong base.

The curing agent for heavy metals in the soil to control the accumulation of heavy metals in crops is characterized in that the substance containing carbon-carbon double bond is selected from more than one of polyisoprene, polyisoprene analog, polyisoprene derived polymer and unsaturated fatty acids, the polyisoprene analog and the polyisoprene derived polymer are natural rubber, natural latex, polyacetylene, polybutadiene or polypentadiene and the unsaturated fatty acid is vegetable oil or gutter oil.

The curing agent for heavy metals in the soil to control the accumulation of heavy metals in crops is characterized in that the sulfo-compound is selected from more than one of sulphur, hydrosulfide, sodium sulfide or ferrous sulfide.

The curing agent for heavy metals in the soil to control the accumulation of heavy metals in crops is characterized in that the organic matter is selected from more than one of colza cake, soybean cake, bean pulp, straw stalk, barley/wheat stalk, sugarcane chip/bagasse, rape stalk, corn sorghum stalk, wood chip, weed stalk, *Astragalus sinicus* stalk, clover stalk, waste paper or water hyacinth.

The curing agent for heavy metals in the soil to control the accumulation of heavy metals in crops is characterized in that the initiator is hydrogen peroxide, peroxyformic acid or peroxy benzoic acid.

The curing agent for heavy metals in the soil to control the accumulation of heavy metals in crops is characterized in that the reducer is selected from more than one of sodium sulfite, zinc powder, iron powder and magnesium powder.

The curing agent for heavy metals in the soil to control ale accumulation of heavy metals in crops is characterized in that the strong base is quicklime, sodium hydroxide or potassium hydroxide.

The preparation method of the curing agent for heavy metals in the soil or to control the accumulation of heavy metals in crops is characterized in that it includes the following processing steps:

1) melt the stated parts by weight of the substance containing carbon-carbon double bond into a liquid state at a temperature of 100~400° C.;

2) add the stated parts by weight of the sulfo-compound and the stated parts by weight of the initiator into the high-temperature liquid solution obtained in Step 1), boil it for 0.5~3 h and keep mixing at a constant speed;

3) cool it to room temperature, add the stated parts by weight of the organic matter into the mixed polymer obtained in Step 2), mix and crush it to a uniform size to get the solid mix polymer;

4) add the stated parts by weight of water, reducer and strong base into the solid mix polymer obtained in Step 3), crush it to a uniform size again, place the crushed solid mix polymer in a steam bath and steam for 0.5~2 h, and then cool it to get the solid mix polymer;

5) put the solid mix polymer obtained in Step 4) to a place of 30~100° C. for airing and drying or exposure in the sun until the water content is no more than 20%;

6) crush the solid mix polymer obtained in Step 5) to a granularity of 60~150 mesh to get the curing agent for heavy metals in the soil to control the accumulation of heavy metals in crops.

The preparation method of the curing agent for heavy metals in the soil to control the accumulation of heavy metals in crops is characterized in that it includes the following processing steps:

1) melt the stated parts by weight of the substance containing carbon-carbon double bond into a liquid state at a temperature of 100~400° C.;

2) add the stated parts by weight of the sulfo-compound and the stated parts by weight of the initiator into the high-temperature liquid solution obtained in Step 1), boil it for 0.5~3 h and keep mixing at a constant speed;

3 cool it to room temperature, mix and crush it to a uniform size to get the powdered solid mix polymer, then add the stated parts by weight of water, reducer and strong base into the powdered solid mix polymer, place the resultant mixture in a steam bath and steam for 0.5~2 h or boil for 0.1~2 h, and then cool it to get the semi-jelly mixture;

4) add the stated parts by weight of the organic matter to the semi-jelly mixture obtained in Step 3), thoroughly mix to get the jelly mixture;

5) put the jelly mixture obtained in Step 4) to a place of 30~100° C. for airing and drying or exposure in the sun until the water content is no more than 20%;

6) crush the solid mix polymer obtained in Step 5) to a granularity of 60~150 mesh to get the curing agent for heavy metals in the soil to control the accumulation of heavy metals in crops.

The curing agent for heavy metals in the soil to control the accumulation of heavy metals in crops mentioned above features a reasonable design and simple preparation. Through a sulfidation and persulfidation reaction of the substance containing carbon-carbon double bond at a high temperature by means of the sulfo-compound in the presence of a certain amount of the initiator, a polymer with a high sulfur content is formed. In the alkaline condition, by relying on the reducibility of the reducer as well as the organic matter itself, the carbon-sulfur bond and sulfur-sulfur bond in macromolecular substances are broken under a high-temperature and high-humidity environment to produce a polymer type curing agent containing a high amount of mercaptan (organic sulfur or sulphydryl). The curing agent is crushed to powder and then applied onto the land. The sulphydryl in the curing agent can form a very stable organic sulfur—a heavy metal composite different from water after combination with cadmium, lead and mercury in the soil, thus reducing the contents of cadmium, lead and mercury in the soil solution and further greatly decreasing the roots absorption of these heavy metals.

There is a high amount of free sulfur in the curing agent which can be used as sulfur fertilizer in the soil to guarantee the demand for sulfur for the crops. Moreover, the curing agent will not cause any harm to the soil. The curing agent according to the present invention boasts of a simple application, low consumption amount, low selling price and low cost. It is generally applicable to dry land with a heavy, medium or slight cadmium contamination and to all kinds of crops.

The curing agent according to the present invention is preferably used as a basic fertilizer applied to the soil once before planting and during land preparations or as an additional fertilizer applied during different growth periods of crops. By taking the sulfur content of the curing agent (vulcanized product of polymer) as a basic measuring component, it is preferable to apply 1.0-1.5 kg of the curing agent (by sulfur) on each mu of farmland. Due to the slow degradation speed, from the next year, only half or three quarters of the amount of the curing agent shall be applied each year.

DETAILED DESCRIPTION

The present invention is further described hereinafter in combination with embodiments.

Embodiment 1

1) melt 100 parts of the polyisoprene into a liquid state at a temperature of 100° C., 150° C. or 300° C.;

2) add 300 parts of sulphur into the high-temperature liquid solution obtained in Step 1), boil it for 0.5, 1, 1.5 or 3 h, and also add 50 parts of the hydrogen peroxide and keep mixing it at a constant speed;

3) cool it to room temperature, add 300 parts of colza cake into the mixed polymer obtained in Step 2), mix and crush it to a uniform size to get the solid mix polymer;

4) add 150 parts of water, 100 parts of sodium sulfite and 150 parts of quicklime into the solid mix polymer obtained in Step 3), crush it to a uniform size again, place the crushed solid mix polymer in a steam bath and steam for 1, 2 or 3 h, and then cool it to get the solid mix polymer;

5) put the solid mix polymer obtained in Step 4) to a place of 30° C. 40° C., 60° C. 80° C., or 100√ C. for airing, and drying or exposure to the sun until the water content is no more than 20%;

6) crush the solid mix polymer obtained in Step 5) to a granularity of 60, 80, 100, 120 or 150 mesh to get the curing agent for heavy metals in the soil to control the accumulation of heavy metals in crops.

The same technical effect as Embodiment 1 can be also achieved if the polyisoprene above is replaced by more than one of polyisoprene, polyisoprene analog, polyisoprene derived polymer and unsaturated fatty acid. The sulphur is replaced by sodium hydrosulphide or sodium sulfide. The hydrogen peroxide is replaced by peroxyformic acid or peroxy benzoic acid, the sodium sulfite is replaced by zinc powder, iron powder or magnesium powder. The quicklime is replaced by sodium hydroxide or potassium hydroxide. The polyisoprene analog and the polyisoprene derived polymer in this embodiment can be natural rubber, natural latex, polyacetylene, polybutadiene or polypentadiene and the unsaturated fatty acid can be vegetable oil or gutter oil.

Embodiment 2

1) melt 60 parts of natural rubber into a liquid state at a temperature of 150° C.;

2) add 50 parts of sodium sulfide into the high-temperature liquid solution obtained in Step 1), boil it for 2.5 h, and also add 20 parts of peroxyformic acid and keep mixing it at a constant speed;

3) cool it to room temperature, add 50 parts of straw stalks into the polymer mix obtained in Step 2), mix and crush it to a uniform size to get the solid mix polymer;

4) add 50 parts of water, 50 parts of zinc powder and 20 parts of sodium hydroxide into the solid mixed polymer obtained in Step 3), crush it to a uniform size again, place the crushed solid mix polymer in a steam bath and steam for 1.5 h, and then cool it to get the solid mix polymer;

5) put the solid mix polymer obtained in Step 4) to a place of 85° C. for airing and drying or exposure to the sun until the water content is no more than 20%;

6) crush the solid mix polymer obtained in Step 5) to a granularity of 120 mesh to get the curing agent for heavy metals in the soil to control the accumulation of heavy metals in crops.

The same technical effect as Embodiment 1 can be also achieved if the straw stalk above is replaced by one of or a mixture of more than one of colza cake, soybean cake, bean pulp, straw stalks, barley/wheat stalks, sugarcane chip/bagasse, rape stalks, corn/sorghum stalks, wood chips, weed stalks, *Astragalus sinicus* stalks, clover stalks, waste paper or water hyacinth.

Embodiment 3

1) melt 140 parts of polybutadiene into a liquid state at a temperature of 150° C.;

2) add 400 parts of sodium hydrosulphide into the high-temperature liquid solution obtained in Step 1), boil it for 2.5 h, and also add 100 parts of peroxy benzoic acid and keep mixing it at a constant speed;

3) cool it to room temperature, add 500 parts of waste paper into the polymer mix obtained in Step 2), mix and crush it to a uniform size to get the solid mix polymer;

4) add 400 parts of water, 200 parts of iron powder and 200 parts of potassium hydroxide into the solid polymer mix obtained in Step 3), crush it to a uniform size again, place the crushed solid polymer mix in a steam bath and steam for 2 h, and then cool it to get the solid mix polymer;

5) put the solid mix polymer obtained in Step 4) to a place of 20° C. for airing and drying or exposure to the sun until the water content is no more than 20%;

6) crush the solid mix polymer obtained in Step 5) to a granularity of 100 mesh to get the curing agent for heavy metals in the soil to control the accumulation of heavy metals in crops.

Embodiment 4

1) melt 80 parts of natural latex into a liquid state at a temperature of 150° C.;

2) add 200 parts of sodium hydrosulphide into the high-temperature liquid solution obtained in Step 1), boil it for 2.5 h, and also add 80 parts of peroxy benzoic acid and keep mixing it at a constant speed;

3) cool it to room temperature, add 200 parts of *Astragalus sinicus* stalks into the mix polymer obtained in Step 2), mix and crush it to a uniform size to get the solid mix polymer;

4) add 300 parts of water, 150 parts of magnesium powder and 80 parts of potassium hydroxide into the solid mix polymer obtained in Step 3), crush it to a uniform size again, place the crushed solid mix polymer in a steam bath and steam for 0.5 h, and then cool it to get the solid mix polymer;

5) put the solid mix polymer obtained in Step 4) to a place of 20° C. for airing and drying or exposure to the sun until the water content is no more than 20%;

6) crush the mix polymer obtained in Step 5) to a granularity of 100 mesh to get the curing agent for heavy metals in the soil to control the accumulation of heavy metals in crops.

Embodiment 5

1) melt 110 parts of polyacetylene into a liquid state at a temperature of 100° C.;

2) add 150 parts of sodium hydrosulphide into the high-temperature liquid solution obtained in Step 1), boil it for 3 h, and also add 40 parts of peroxy benzoic acid and keep mixing it at a constant speed;

3) cool it to room temperature, add 250 parts of clover stalks into the mix polymer obtained in Step 2), mix and crush it to a uniform size to get the solid mix polymer;

4) add 250 parts of water, 120 parts of magnesium powder and zinc powder, respectively, and 120 parts of potassium hydroxide into the solid mix polymer obtained in Step 3), crush it to a uniform size again, place the crushed solid mix polymer in a steam bath and steam for 2 h, and then cool it to get the solid mix polymer;

5) put the solid mix polymer obtained in Step 4) to a place of 20° C. for airing and drying or exposure to the sun until the water content is no more than 20%;

6) crush the solid mix polymer obtained in Step 5) to a granularity of 100 mesh to get the curing agent for heavy metals in the soil to control the accumulation of heavy metals in crops.

Embodiment 6

1) melt 100 parts of polyisoprene into a liquid state at a temperature of 160° C.;

2) add 200 parts of sulphur powder into the high-temperature liquid solution obtained in Step 1), boil it for 1 h and keep mixing it at a constant speed;

3) cool it to room temperature, add 250 parts of colza cake into the mix polymer obtained in Step 2), mix and crush it to a uniform size to get the solid mix polymer;

4) add 100 parts of magnesium powder and 100 parts of potassium hydroxide into the solid mix polymer obtained in Step 3), crush it to a uniform size again, place the crushed solid mix polymer in a steam bath and steam for 2 h, and then cool it to get the solid mix polymer;

5) put the solid mix polymer obtained in Step 4) to a place of 20° C. for airing and drying or exposure to the sun until the water content is no more than 20%;

6) crush the solid mix, polymer obtained in Step 5) to a granularity of 100 mesh to get the curing agent for heavy metals in the soil to control the accumulation of heavy metals in crops.

Embodiment 7

1) melt 120 parts of vegetable oil or gutter oil into a liquid state at a temperature of 250° C.

2) add 120 parts of sodium sulfide and 25 parts of hydrogen peroxide into the high-temperature liquid solution obtained in Step 1), boil it for 1.5 h and keep mixing it at a constant speed;

3) cool it to room temperature, mix and crush it to a uniform size to get the powdered solid mix polymer, then add 120 parts of water, 100 parts of zinc powder and 150 parts of quicklime into the powdered solid mix polymer, place the resulting mixture in a steam bath and steam for 1.5 h or boil for 0.8 h, and then cool it to get the semi-jelly mixture;

4) add 380 parts soybean cake into the semi-jelly mixture obtained in Step 3), thoroughly mix to get the jelly mixture;

5) put the jelly mixture obtained in Step 4) to a place of 80° C. for airing and drying or exposure to the sun until the water content is no more than 20%;

6) crush the solid mix polymer obtained in Step 5) to a granularity of 120 mesh to get the curing agent for heavy metals in the soil to control the accumulation of heavy metals in crops.

Embodiment 8

1) melt 85 parts of vegetable oil (peanut oil, bean oil, linseed oil, castor oil or rapeseed oil, etc.) into a liquid state at a temperature of 350° C.;

2) add 60 parts of ferrous sulfide, 60 parts of sulphur and 70 parts of peroxy benzoic acid into the high-temperature liquid solution obtained in Step 1), boil it for 2.5 h and keep mixing it at a constant speed;

3) cool it to room temperature, mix and crush it to a uniform size to get the powdered solid mix polymer, then add 220 parts of water, 50 parts of zinc powder, 60 parts of magnesium powder and 150 parts of quicklime into the powdered solid mix polymer, place the resulting mixture in a steam bath and steam for 1.5 h or boil for 0.8 h, and then cool it to get the semi-jelly mixture;

4) add 60 parts of soybean cake, 70 parts of bean pulp and 80 parts of waste paper into the semi-jelly mixture obtained in Step 3), thoroughly mix to get the jelly mixture;

5) put the jelly mixture obtained in Step 4) to a place of 80° C. for airing and drying or exposure to the sun until the water content is no more than 20%;

6) crush the solid mixed polymer obtained in Step 5) to a granularity of 120 mesh to get the curing agent for heavy metals in the soil to control the accumulation of heavy metals in crops.

Embodiment 9

Experiment on the absorption of solution cadmium, lead and mercury for the curing agent: take the curing agent prepared according to Embodiment 1 as the test agent. Prepare 6 L of cadmium, lead and mercury solution with concentrations of 5, 30 and 0.5 mg/kg, respectively. Place the 6 L of solution in 6 clean black plastic barrels, each barrel containing 1 L. Set up CK and 0.5 g/barrel for two treatments for the curing agent and repeat three times. Add the curing agent, mix thoroughly and keep this state for 8 h stirring occasionally. Take 50 mL of the solution, keep centrifugation for 10 min with a centrifuge at a speed of 4000 and take the supernatant and then measure the cadmium, lead and mercury with an ICP-AES and an atomic fluorescence spectrophotometer, respectively. The result shows that the concentrations of solution cadmium, lead and mercury treated by the curing agent are $0.21\pm0.017$, $1.38\pm0.099$ and $0.03\pm0.001$ mg/kg, respectively (three duplicate values); while those from CK are 4.87, 30.8 and 0.51 mg/kg, respectively. After treatment with the curing agent, the concentrations of cadmium, lead and mercury in solution are reduced greatly, exhibiting that the curing agent has very strong curing or adsorption capacity for cadmium, lead and mercury in solution.

Make the experiment under the same condition as in Embodiment 9 to the curing agent prepared according to Embodiment 2-8. The concentrations of cadmium, lead and mercury in the resultant solution are below 0.21, 1.38 and 0.03 mg/kg.

Embodiment 10

Experiment of absorption of soil cadmium for the curing agent: take the paddy field soil contaminated by cadmium which was previously prepared and was devoted to rice cultivation for many years as the material, where the total cadmium content is 5.76 mg/kg. Air to dry and crush the soil and sieve it at the opening size of 60 mesh. Take 6 clean beakers whose volume is 1 L, take 1 kg dry soil accurately weighed and put it into the beakers, respectively. Add 1 L of distilled water into the beakers, mix thoroughly and keep them for 3 days.

Take the curing agent prepared according to Embodiment 5 as the study material, set up CK and 0.5 g/beaker for the curing agent, and allow three repetitions. After adding to the beakers, mix thoroughly and keep for another 3 days. Take 20 g of wet soil, place it into a centrifuge tube, keep centrifugation for 15 min with a high-speed centrifuge at a speed of 8000, and take the supernatant for element measurement (obtain sufficient supernatant by multiple repeated samplings and centrifugation). The measurement result shows that upon treatment with the curing agent, the concentration of cadmium in soil solution is $0.17\pm0.06$ mg/kg, while without applying the curing agent is $1.46\pm0.19$ mg/kg. After treatment by the curing agent, the concentration of cadmium in the soil solution is reduced greatly, exhibiting that the curing agent has a very strong curing or adsorption capacity for cadmium in the soil.

Make the experiment under the same condition as in Embodiment 10 to the curing agent prepared according to Embodiments 1, 2, 3, 4, 6, 7 and 8. The concentration of cadmium in the resulting soil solution is below 0.17 mg/kg.

Embodiment 11

Experimental Material: Miyang 46

Experimental soil: use the soil from the test fields of the China National Rice Research Institute (Fuyang of Zhejiang), dry the soil in the sun and then crush to 60 mesh, add cadmium sulfate to make the cadmium content in the soil become 25 mg/kg. Weigh 4.5 kg of cadmium-contaminated soil into a black plastic barrel of 5 L, add water and mix thoroughly. Keep the soil in a wet state for 2 weeks for further use.

Experiment treatment: set up CK (the curing agent not added), conduct surface application (application on surface and mixing up on surface) and deep application (thoroughly mixing up). Treatment of the curing agent: add 1.25 g of the curing agent prepared according to Embodiment 7 in the barrel, and let it rest for a night. Transplant the rice seedlings with the leaf age in the period of three leaves and one core, each pot containing 4 holes and each hole containing 3 seedlings. During the growth of the paddy rice, keep a 1 cm thick water layer.

Determination items: 30 days after the planting of the seedlings, take the soil on top, rinse it from 2-3 times in 0.1% diluted flood water, roast for 2 h at a temperature of 120° C. and then dry at a temperature of 60° C. until a constant mass is obtained. Crush the dry sample to powder, weigh 0.5000 g of the powder, nitrate-boil it with a mixing solution of concentrated nitric acid and perchloric acid (1:3), and then add redistilled water until a total volume of 25 mL is reached. Finally, measure the contents of elements such as Mn, Pb, Cd, Fe, Cu and Zn with a full-spectrum direct-reading inductively coupled plasma atomic emission spectrometry (ICP-AES).

Results and Analysis:

TABLE 1

Influences of the curing agent to the absorption and accumulation of elements such as Cd in paddy rice

| Treatment | Cadmium (mg/kg) | Lead (mg/kg) | Copper (mg/kg) | Manganese (mg/kg) | Iron (mg/kg) | Zinc (mg/kg) |
|---|---|---|---|---|---|---|
| CK | 0.76 | 0.21 | 29.9 | 632.85 | 125.0 | 71.74 |
| CK | 0.79 | 0.75 | 30.42 | 706.22 | 152.36 | 76.87 |
| Shallow application on surface | 0.59 | 0.21 | 29.58 | 669.21 | 127.07 | 74.31 |
| Shallow application on surface | 0.59 | 0.27 | 52.58 | 715.14 | 167.97 | 67.21 |
| Deep application and thorough mixing | 0.28 | 0.18 | 23.5 | 594.09 | 122.41 | 61.19 |
| Deep application and thorough mixing | 0.38 | 0.22 | 28.0 | 643.0 | 130.66 | 65.62 |

After the curing agent is shallowly applied on the surface, cadmium in the plant is reduced by 23.87%; while after deep application and thorough mixing, it is reduced by 57.42%, showing a highly significant effect. No matter the shallow application on the surface or a deep application and thorough mixing, the accumulation of elements such as iron, manganese, copper and zinc in plants caused by the curing agent has no significant difference. The result shows that the curing agent has a strong control effect on the accumulation of cadmium in paddy rice.

Make the experiment under the same condition as in Embodiment 11 to the curing agent prepared according to Embodiments 1, 2, 3, 4, 5, 6 and 8. After a shallow application of the curing agent on the surface, cadmium in the plant is reduced by over 23%; while upon deep application and thorough mixing, cadmium in plant is reduced by over 57%, showing a highly significant effect.

Embodiment 12

Experiment Design:

Carefully select 500 seeds of tobacco type K326, use 2% $H_2O_2$ for surface disinfection for 20 min, then wash the seeds with distilled water, soak them for 3 h at 25° C., keep accelerating germination for 1 d at 25° C., then place them in the greenhouse of Zijingang Campus of Zhejiang University, use vermiculite for plug seeding at a temperature of 25° C./20° C. (day/night). The four-leaf period comes 60 d after seeding. Select seedlings in the consistent growth condition and transplant them to the treated soil (April 19). Mix Cd and soil thoroughly 14 d before transplanting, treat the curing agent 7 d before transplanting and keep the soil wet. Use 5 L plastic barrels for the experiment with each barrel containing 4.5 kg of soil, 4 plants, 3 repetitions, 4 barrels/treatment, a total of 144 plants (9×4×4), and then take samples in the 6-leaf period 20 d after transplanting (May 9), where only the top part is sampled. A total of 9 treatments are set up:

1. CK, Cd and the curing agent not added;
2. A, 1.25 gA/pot;
3. B. 1.25 gB/pot;
4. Cd1, 1 mg/kg $CdCl_2$;
5. Cd1+A, 1 mg/kg $CdCl_2$+1.25 gA/pot
6. Cd1+B, 1 mg/kg $CdCl_2$+1.25 gB/pot
7. Cd2, 5 mg/kg $CdCl_2$;
8. Cd2+A, 5 mg/kg $CdCl_2$+1.25 gA/pot
9. Cd2+B, 5 mg/kg $CdCl_2$+1.25 gB/pot B is the curing agent prepared according to Embodiment 7; A is the raw materials used in Embodiment 7, which are obtained by simple mixing and then high-temperature distillation and used for control.

Experiment Results:

1. Agronomic Properties:

TABLE 2

Agronomic properties in the experiment for heavy metal cadmium to be relieved by the curing agent in tobacco

| Treatment | Plant height (cm) | | Fresh weight (g) | | Dry weight (g) | | SPAD | |
|---|---|---|---|---|---|---|---|---|
| Cond stomatal conductivity | 24.80 ± 0.71 | a | 9.59 ± 0.95 | ab | 2.338 ± 0.18 | ab | 33.64 ± 1.73 | a |
| A | 23.53 ± 4.81 | ab | 8.86 ± 0.85 | ab | 2.462 ± 0.22 | a | 32.78 ± 1.54 | ab |

TABLE 2-continued

Agronomic properties in the experiment for heavy metal cadmium to be relieved by the curing agent in tobacco

| Treatment | Plant height (cm) | | Fresh weight (g) | | Dry weight (g) | | SPAD | |
|---|---|---|---|---|---|---|---|---|
| B | 24.27 ± 2.56 | ab | 10.2 ± 1.33 | ab | 2.651 ± 0.39 | a | 33.4 ± 1.48 | a |
| Cd1 | 19.70 ± 1.48 | cd | 7.91 ± 0.77 | a | 1.894 ± 0.26 | c | 33.02 ± 2.00 | ab |
| Cd1 + A | 20.50 ± 1.97 | bcd | 8.36 ± 1.33 | b | 2.021 ± 0.38 | bc | 33.64 ± 2.55 | a |
| Cd1 + B | 22.70 ± 0.46 | abc | 9.65 ± 1.21 | b | 2.075 ± 0.45 | bc | 33.44 ± 0.68 | a |
| Cd2 | 21.47 ± 2.42 | abc | 8.95 ± 1.30 | ab | 1.990 ± 0.21 | bc | 32.72 ± 1.26 | ab |
| Cd2 + A | 17.53 ± 0.58 | d | 6.82 ± 0.09 | b | 1.809 ± 0.21 | c | 34.1 ± 1.80 | a |
| Cd2 + B | 17.30 ± 1.39 | d | 7.85 ± 0.72 | ab | 1.936 ± 0.40 | c | 31.0 ± 0.75 | b |

Note:
the letters in the table show significant level, the same as in the report.

Concentration of heavy metal cadmium:

TABLE 3

Contents of cadmium in various treatments to be relieved by the curing agent in tobacco

| Code | Cd (mg/kg) | Content of fertilizer sulfur (g/pot) | | Cd concentration (µg/g) | | | |
|---|---|---|---|---|---|---|---|
| | | A | B | Repeat I | Repeat II | Repeat III | Average |
| CK | 0 | 0 | 0 | 0.019 | 0.020 | 0.016 | 0.018 |
| A | 0 | 1.25 | 0 | 0.007 | 0.005 | 0.003 | 0.005 |
| B | 0 | 0 | 1.25 | 0.020 | 0.016 | 0.016 | 0.018 |
| Cd1 | 1.0 | 0 | 0 | 0.584 | 0.764 | 0.670 | 0.673 |
| Cd1 + A | 1.0 | 1.25 | 0 | 0.354 | 0.158 | 0.406 | 0.306 |
| Cd1 + B | 1.0 | 0 | 1.25 | 0.146 | 0.136 | 0.197 | 0.160 |
| Cd2 | 5.0 | 0 | 0 | 1.432 | 2.356 | 2.960 | 2.249 |
| Cd2 + A | 5.0 | 1.25 | 0 | 2.419 | 3.825 | 1.848 | 2.698 |
| Cd2 + B | 5.0 | 0 | 1.25 | 1.420 | 2.119 | 0.651 | 1.396 |

3. Light and Parameters

TABLE 4

Photosynthetic parameters of tobacco leaves

| Code | Photosynthetic rate (µmol $CO_2$ m-2 s-1) | | Stomatal conductivity (mol $H_2O$ m-2 s-1) | | Intercellular $CO_2$ concentration (µmol $CO_2$ mol-1) | | Transpiration rate (mmol $H_2O$ m-2 s-1) | |
|---|---|---|---|---|---|---|---|---|
| CK | 15.28 ± 1.25 | a | 0.2716 ± 0.05 | bc | 310.8 ± 13.29 | e | 3.348 ± 0.77 | bc |
| A | 15.16 ± 1.61 | ab | 0.3062 ± 0.13 | abc | 313.2 ± 16.27 | e | 3.696 ± 1.29 | ab |
| B | 14.06 ± 0.50 | cd | 0.3464 ± 0.09 | ab | 322.2 ± 10.99 | de | 4.458 ± 0.57 | a |
| Cd1 | 13.78 ± 0.52 | d | 0.2614 ± 0.07 | c | 344 ± 10.63 | ab | 2.676 ± 0.87 | c |
| Cd1 + A | 14.14 ± 0.79 | bcd | 0.332 ± 0.05 | abc | 328.6 ± 5.94 | cd | 3.942 ± 0.67 | ab |
| Cd1 + B | 14.96 ± 0.48 | abc | 0.3618 ± 0.04 | a | 337 ± 6.52 | bc | 4.06 ± 0.43 | ab |
| Cd2 | 12.52 ± 0.55 | e | 0.3328 ± 0.00 | abc | 329.6 ± 4.56 | cd | 4.374 ± 0.23 | a |
| Cd2 + A | 11.42 ± 0.77 | f | 0.3038 ± 0.03 | abc | 351.4 ± 7.64 | a | 4.62 ± 0.82 | a |
| Cd2 + B | 12.46 ± 0.44 | ef | 0.272 ± 0.01 | bc | 320 ± 1.87 | de | 4.49 ± 0.07 | a |

Result Analysis:

1. Influences of A and B on the growth of tobacco seedlings under cadmium stress A negative correlation is found between the concentration of cadmium and the inhibition to growth 20 d after transplanting (Table 2). High-concentration cadmium facilitates the growth of the top part of the tobacco, but not significantly. Meanwhile, upon the treatment with low-concentration cadmium, A and B effectively relieve the inhibition to the growth of tobacco. With high-concentration cadmium, A and B aggravate the inhibition to the growth of tobacco, which shows that the curing agent in this condition facilitates the accumulation of cadmium in the tobacco leaf, thus further causing the aggravated inhibition to the growth of tobacco after the tobacco is contaminated by cadmium. This indicates that, antagonism occurs between sulfur and cadmium when cadmium is in low concentrations and synergy occurs when cadmium is in high concentration. This may be caused by the curing agent which facilitates the accumulation of cadmium in the roots and stems to transfer to the leaves (An Zhizhuang et al, 2004), while Fertilizer A has a higher transfer effect to cadmium than Fertilizer B.

2. Influences of A and B on the chlorophyll content (SPAD value) of tobacco seedlings under cadmium stress A positive correlation is found between the SPAD value of leaves and the chlorophyll content. The measuring result is a relative value reflecting the chlorophyll content of the leaves. In this experiment, cadmium treatment reduces the chlorophyll content of tobacco leaves (Table 2), but not significantly. The application of A and B increases the chlorophyll content of leaves, but still not significantly. This may be because the low cadmium concentration in the leaves cannot lead to big destruction of the chlorophyll structure.

3. Influences of A and B on the cadmium content in tobacco seedlings under the cadmium stress After cadmium is absorbed by the plants, most cadmium enriches the roots and little cadmium transfers to the aboveground part (Table 3). With the low-concentration cadmium, both A and B can significantly reduce the concentration of cadmium in tobacco seedlings, especially under the treatment of B, the aboveground cadmium content is reduced by 76% than the single-cadmium treatment. Under the treatment of high-concentration cadmium, Fertilizer B significantly reduces the accumulated cadmium content at the roots only. This shows that Fertilizer A is effective only for the reduction of the aboveground cadmium content under the treatment of low-concentration cadmium, but Fertilizer B is effective in the reduction of the cadmium content under the treatment of cadmium with different concentrations.

4. Influences of A and B on the photosynthetic parameters of tobacco leaves under cadmium stress Compared with the control level, the cadmium stress reduces the photosynthetic rate (9.81% in Cd1, 18.1% in Cd2), as shown in Table 4. Both A and B in Cd1 increase the photosynthetic rate, but the application of A in Cd2 significantly reduces the photosynthetic rate. However, it is worth mentioning that application B leads to the photosynthetic rate to be restored to almost the control level. B effectively relieves the reduction of the photosynthetic rate caused by the cadmium.

The cadmium treatment has a complicated impact on the stomatal conductivity of tobacco. The stomatal conductivity is reduced in Cd 1, increased in Cd2, but both not significantly. A and B have inhibition effect on the stomatal conductivity only when the cadmium concentration is high. No matter the increase or reduction of the stomatal conductivity, B is more significant than A.

Cadmium also increases intercellular $CO_2$ concentration in the leaves. Between the two fertilizers, A is more susceptible to the concentration of cadmium. Under the cadmium stress with two concentrations, B can reduce intercellular $CO_2$ concentration, but not significantly.

After the cadmium treatment, compared with the control level, the transpiration rate in Cd1 is significantly reduced while that in Cd2 is significantly increased. Under the cadmium treatment with different concentrations, both A and B can increase the transpiration rate (both showing significant increase in Cd1), but the increase in the transpiration rate for A is higher than that for B only in Cd2, A and B have also inconsistent change of the transpiration rate under the cadmium treatment with the two concentrations.

What is claimed is:

1. A soil heavy metal curing agent for controlling accumulation of heavy metals of crops, being made from the following parts of raw materials by weight:
   90~110 parts of substance containing carbon-carbon double bond, 80~150 parts of sulfo-compound, 200~300 parts of organic matter with 10% water content, 100~200 parts of water, 40~60 parts of an initiator, 80~110 parts of a reducer, and 80~110 parts of a strong base, wherein,
   the substance containing carbon-carbon double bond is at least one selected from the group consisting of polyisoprene, polyisoprene analog, polyisoprene derived polymer and an unsaturated fatty acid,
   the polyisoprene analog and the polyisoprene derived polymer are one of natural rubber, natural latex, polyacetylene, polybutadiene or polypentadiene, and the unsaturated fatty acid is one of vegetable oil or gutter oil,
   wherein the sulfo-compound is at least one selected from the group consisting of sulfur, hydrosulfide, sodium sulfide or ferrous sulfide,
   wherein the organic matter is at least one selected from the group consisting of colza cake, soybean cake, bean pulp, straw stalks, barley or wheat stalks, sugarcane chip/bagasse, rape stalks, corn or sorghum stalks, wood chins, weed stalks, *astragalus sinicus* stalks, clover stalks, waste paper or water hyacinth,
   wherein the initiator is one of hydrogen peroxide, peroxyformic acid or peroxy benzoic acid,
   wherein the reducer is at least one selected from the group consisting of sodium sulfite, zinc powder, iron powder and magnesium powder.

2. The soil heavy metal curing agent according to claim 1, wherein,
   the strong base is quicklime, sodium hydroxide or potassium hydroxide.

\* \* \* \* \*